United States Patent
Beinborn et al.

(10) Patent No.: US 12,486,814 B2
(45) Date of Patent: Dec. 2, 2025

(54) SYSTEMS AND METHODS FOR BYPASSING A COMPROMISED ENGINE CYLINDER

(71) Applicants: Cummins Inc., Columbus, IN (US); Tula Technology, Inc., San Jose, CA (US)

(72) Inventors: Aaron William Beinborn, Greenwood, IN (US); J. Steven Kolhouse, Columbus, IN (US); David J. Langenderfer, Columbus, IN (US); David Schmidt, Indianapolis, IN (US)

(73) Assignees: Cummins Inc, Columbus, IN (US); Tula Technology, Inc, San Jose, CA (US)

( * ) Notice: Subject to any disclaimer, the term of this patent is extended or adjusted under 35 U.S.C. 154(b) by 50 days.

(21) Appl. No.: 18/373,144

(22) Filed: Sep. 26, 2023

(65) Prior Publication Data

US 2024/0159196 A1 May 16, 2024

Related U.S. Application Data

(63) Continuation of application No. 17/987,700, filed on Nov. 15, 2022, now Pat. No. 11,802,519.

(51) Int. Cl.
*F02D 41/00* (2006.01)
*F02D 13/02* (2006.01)
(Continued)

(52) U.S. Cl.
CPC ..... *F02D 41/0087* (2013.01); *F02D 13/0207* (2013.01); *F02D 41/024* (2013.01);
(Continued)

(58) Field of Classification Search
CPC .... F02D 41/0087; F02D 41/024; F02D 41/22; F02D 41/401; F02D 13/0207;
(Continued)

(56) References Cited

U.S. PATENT DOCUMENTS 5,070,832 A   12/1991  Hapka et al.
6,516,781 B2   2/2003  Weisman
(Continued)

FOREIGN PATENT DOCUMENTS

CN    104895685 A  *  9/2015  ............. F02D 17/02
EP    2 375 038 B1   10/2011
(Continued)

OTHER PUBLICATIONS

Non-Final Office Action on U.S. Appl. No. 17/987,700 DTD Feb. 28, 2023.
(Continued)

*Primary Examiner* — Hai H Huynh
(74) *Attorney, Agent, or Firm* — Foley & Lardner LLP

(57) ABSTRACT

A system includes a controller having at least one processing circuit including at least one memory coupled to at least one processor. The controller is configured to: receive data regarding operation of an engine indicating that one or more cylinders of a plurality of cylinders of the engine is compromised; cause the engine to operate in a modified engine operating mode whereby operation of the one or more cylinders that is compromised is modified; cause the engine to operate in a non-modified engine operating mode whereby operation of the one or more cylinders that is compromised is not modified responsive to receiving information regarding a predetermined condition despite the data regarding operation of the engine indicating that the one or more cylinders of the plurality of cylinders of the engine is compromised.

20 Claims, 5 Drawing Sheets

(51) Int. Cl.
  *F02D 41/02* (2006.01)
  *F02D 41/22* (2006.01)
  *F02D 41/40* (2006.01)

(52) U.S. Cl.
  CPC ........... *F02D 41/22* (2013.01); *F02D 41/401* (2013.01); *F02D 2200/10* (2013.01)

(58) Field of Classification Search
  CPC .. F02D 13/0203; F02D 13/06; F02D 2200/10; F02D 2041/0012; F02D 2041/227; F02D 2041/228
  USPC ....... 123/345, 346, 347, 348, 673, 674, 675, 123/676, 691, 692, 90.11, 90.15, 198 F, 123/406.27; 701/103, 107, 111
  See application file for complete search history.

(56) References Cited

U.S. PATENT DOCUMENTS

| | | | |
|---|---|---|---|
| 6,843,229 B2 | 1/2005 | Bauerle et al. | |
| 7,660,662 B2 | 2/2010 | Groer et al. | |
| 8,301,362 B2 | 10/2012 | Buslepp et al. | |
| 9,175,613 B2 | 11/2015 | Parsels et al. | |
| 9,828,925 B2 | 11/2017 | Slaton et al. | |
| 9,835,101 B2 | 12/2017 | Leone et al. | |
| 10,323,588 B2 | 6/2019 | Vanderwege | |
| 10,330,035 B2 | 6/2019 | Martin et al. | |
| 10,816,438 B2 | 10/2020 | Chen et al. | |
| 10,845,270 B2 | 11/2020 | Kupiec et al. | |
| 2012/0324989 A1 | 12/2012 | Patel et al. | |
| 2018/0194356 A1 | 7/2018 | Richards et al. | |
| 2020/0000089 A1 | 1/2020 | Hojo et al. | |
| 2021/0003088 A1 | 1/2021 | Chen et al. | |
| 2022/0154653 A1 | 5/2022 | Mccarthy et al. | |

FOREIGN PATENT DOCUMENTS

| | | | | |
|---|---|---|---|---|
| JP | 4164614 B2 | 10/2008 | | |
| JP | 2010-112231 A | 5/2010 | | |
| WO | WO-2009/037046 A1 | 3/2009 | | |
| WO | WO-2018152384 A1 | * | 8/2018 | ............. F02D 17/02 |
| WO | WO-2020/051052 A1 | 3/2020 | | |

OTHER PUBLICATIONS

Notice of Allowance on U.S. Appl. No. 17/987,700 DTD Jun. 26, 2023.

International Search Report and Written Opinion for International Application No. PCT/US2023/033710 mailing date Dec. 14, 2023, 6 pages.

* cited by examiner

SYSTEMS AND METHODS FOR BYPASSING A COMPROMISED ENGINE CYLINDER

CROSS-REFERENCE TO RELATED APPLICATION

This application is a Continuation of U.S. application Ser. No. 17/987,700, filed Nov. 15, 2022, which is incorporated herein by reference in its entirety.

TECHNICAL FIELD

The present disclosure relates to engine systems which may include or be coupled to exhaust aftertreatment systems. More particularly, the present disclosure relates to systems and methods for detecting a potentially compromised engine cylinder(s) and bypassing or skipping operation of the potentially compromised cylinder(s) using cylinder deactivation to achieve one or more predefined objectives.

BACKGROUND

An engine include one or more engine cylinders for combusting fuel and generating power. The cylinders, however, may degrade in performance and require maintenance and/or replacement. Onboard sensors and diagnostic systems may be used to monitor performance of the cylinders in order to determine when the cylinders may have failed, likely failed, or are otherwise not performing within expected or desired operating parameters. A failed or likely failed cylinder may adversely impact the performance of the engine, for example, by increasing harmful exhaust gas emissions (e.g., nitrous oxides (NOx), sulfur oxides, particulate matter, etc.), decreasing fuel efficiency, decreasing engine power output, and so on. Therefore, timely and accurate diagnosis and maintenance may be important to help keep the engine system along with its various systems and devices operating as desired.

SUMMARY

One embodiment relates to an apparatus. The apparatus includes a controller including at least one processing circuit having at least one memory coupled to at least one processor. The controller is configured to: determine that one or more cylinders of a plurality of cylinders of an engine is compromised based on data regarding operation of the engine; and cause the engine to operate in a modified engine operating mode whereby operation of the one or more cylinders that are compromised is modified.

Another embodiment relates to a system. The system includes an engine coupled to a controller. The controller includes at least one processor and at least one memory coupled to the at least one processor. The at least one memory stores instructions that, when executed by the at least one processor, cause the controller to: determine that one or more cylinders of a plurality of cylinders of the engine is compromised based on data regarding operation of the engine; and cause the engine to operate in the modified engine operating mode whereby operation of the one or more cylinders that are compromised is modified.

Yet another embodiment relates to a method. The method includes: determining that one or more cylinders of a plurality of cylinders of an engine are compromised based on data regarding operation of the engine; receiving an operating objective; causing the engine to operate in the modified engine operating mode whereby operation of the one or more cylinders that are compromised is modified based on the received operating objective.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
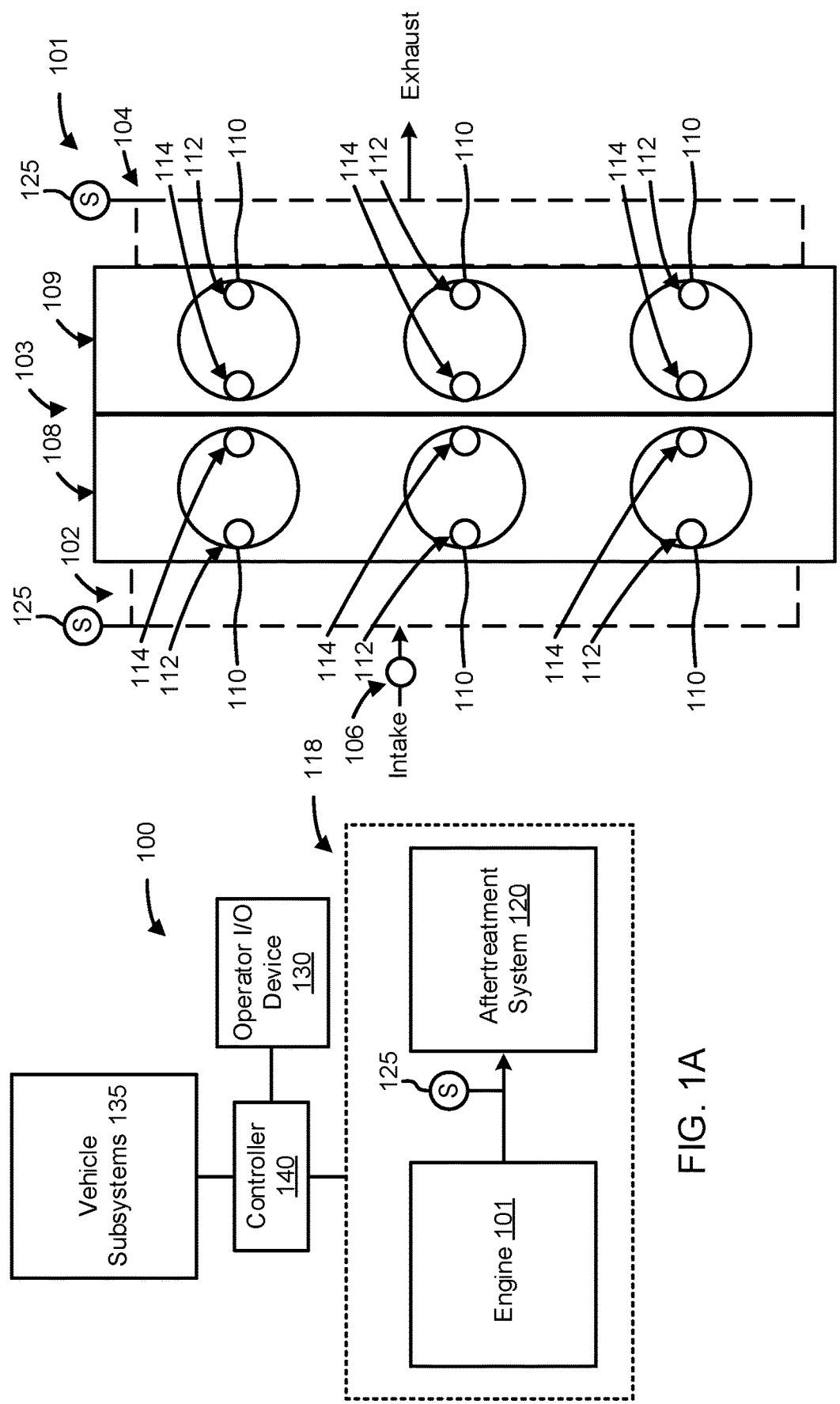
FIG. 1A is a schematic view of a block diagram of a vehicle system, according to an example embodiment.
FIG. 1B is a schematic view of a block diagram of an engine of the vehicle system of FIG. 1A, according to an example embodiment.

Following below are more detailed descriptions of various concepts related to, and implementations of, methods, apparatuses, and systems for monitoring one or more parameters of one or more cylinders of an engine and controlling the one or more of the cylinders based on the monitored one or more parameters. A system may include an engine having one or more cylinders and an exhaust aftertreatment system coupled to the one or more cylinders. Beneficially and as described herein, a controller or control system may detect one or more problem/compromised cylinders of the engine and initiate cylinder deactivation operating mode to achieve one or more objectives (e.g., emissions goals, mission goals such as arriving at a destination, and so on) and avoid further issues (e.g., degradation, etc.) with respect to the one or more compromised cylinders. Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

As used herein a "parameter," "parameter value," and similar terms, in addition to the plain meaning of these terms, refer to an input, output, or other value associated with a component of the systems and/or components thereof described herein. For example, a parameter may include a sensor value detected by an actual sensor or determined by a virtual sensor. A parameter may include a value, control setting, or other control signal used by the control system to control one or more components described herein. Thus, a parameter may include data or information.

As used herein, the term or phrase "operating objective(s)," "operational objective(s)," and similar terms, in addition to the plain meaning of these terms, refer to a target value associated with or constraint imposed on the system or and/or components thereof described herein. For example, an operating objective or, in some instants, a constraint may include a target torque value, a target power value, a maximum allowed power output, a target fuel economy value, a target emissions value (e.g., an emissions constraint on the system such as NOx limit, a greenhouse gases limit, etc.), or other target/constraint value described herein. The operating objective may be defined by a user input, such as depressing an accelerator pedal (e.g., a desired vehicle speed). The operating objective may be or include a mission that is characterized by one or more mission characteristics, such as a target distance for the system (e.g., to arrive at a desired location), a target destination, a target fuel economy for a trip, etc. The operating objective may be defined by a third-party, such as a government agency or regulatory body, which may correspond to a location of the system. For example, a government agency may set a maximum emissions output value for the system while the system is in a certain region. Thus, an operating objective may include one or more target values, a system mission, a third-party defined target value, and so on.

As described herein, an engine system may include an engine and an exhaust aftertreatment system in exhaust gas receiving communication with the engine. The engine may be coupled to one or more components, such as an intake manifold, an exhaust manifold, and include a cylinder block having one or more cylinders. The exhaust aftertreatment system may include one or more components, such as a particulate filter configured to remove particulate matter, such as soot, from exhaust gas flowing in the exhaust aftertreatment system, a dosing module (e.g., a doser) configured to supply a dosing fluid to the exhaust gas flowing in the exhaust gas system, and one or more catalyst devices configured to facilitate conversion of the exhaust gas constituents (e.g., nitrogen oxides, NOx) to less harmful elements (e.g., water, nitrogen), such as a diesel oxidation catalyst, a selectively catalytic reduction (SCR) system, a three-way catalyst, and so on. A control system or controller may monitor one or more parameters of the components of the engine system using one or more sensors (e.g., actual sensors and/or virtual sensors) to collect and/or determine sensor data. The control system may analyze the sensor data and compare the analyzed sensor data to one or more thresholds. The control system may determine that one or more of the cylinders may be compromised (e.g., not working as intended, experiencing one or more error/fault conditions, failed or likely to fail, etc.) based on the analyzed sensor data exceeding a maximum threshold, being below a minimum threshold, or otherwise not falling within a predefined desired/acceptable range. The compromised cylinder(s) may adversely impact the performance of the engine and system overall by, for example, increasing harmful exhaust gas emissions (e.g., nitrous oxides (NOx), sulfur oxides, particulate matter, etc.), decreasing fuel efficiency, decreasing engine power output, and/or so on. As described herein, the control system may initialize a modified engine (or, system more generally) operating mode to account for and address the compromised one or more cylinders by temporarily disabling the compromised engine cylinder(s).

Technically and beneficially, the systems, methods, and apparatuses described herein provide an improved control system that uses sensor data to determine a modified operating mode for the engine system. The control system described herein advantageously utilizes a particular control strategy to determine one or more parameters of the modified operating mode to satisfy one or more target operating objectives, such as a NOx conversion target (e.g., a target amount of NOx reduced by the SCR, also referred to as deNOx) and/or an engine output (e.g., engine output torque, speed, power, etc.). Further, the systems and methods described herein provide a technical solution to the technical problem of enabling a modified operating mode for an engine system when one or more components of the engine system (e.g., one or more cylinders) are compromised or potentially compromised by using a particular computer-based process that advantageously optimizes for both aftertreatment efficiency (e.g., deNOx) and engine output. Advantageously and in some embodiments, the modified operating mode is enabled automatically (e.g., without user input) and is dynamically adjusted based on an operating condition of the engine system.

In an example scenario, a control system (e.g., a controller, a vehicle controller, etc.) is structured to determine whether one or more components of an engine system (e.g., one or more cylinders) are compromised or potentially compromised. The control system may utilize one or more sensors (e.g., real sensors and/or virtual sensors) to detect (receive or determine) data corresponding to the one or more cylinders (e.g., "cylinder data"). The cylinder data may include one or more operating parameters indicative of a performance of each of the cylinders (e.g., cylinder pressure via a cylinder pressure sensor, cylinder temperature, heat maps of the cylinder via an IR camera, and so on). The control system may analyze the cylinder data by using one or more of a lookup table, a statistical model (e.g., a regression model, a machine learning model, etc.), and/or another process to compare the one or more parameters with a respective threshold (e.g., determining if a parameter is above a respective maximum threshold, a parameter is below a minimum threshold, or otherwise not does not satisfy a threshold range). The control system may determine, based on analyzing the cylinder data, that one or more of the cylinders are compromised or potentially compromised. The control system may initialize the modified operating mode for the engine based on determining that one or more of the cylinders are compromised or potentially compromised.

In some embodiments, the modified operating mode may include adjusting one or more operating parameters of the engine. In these embodiments, the control system may analyze a failure or potential failure type of the compromised cylinder(s) and determine whether the failure type can be fixed or likely can be fixed. For example, the control system may determine that the failure type may be fixed by adjusting one or more operating parameters of the cylinder or engine, such as an air to fuel ratio, a spark timing, and so on. In some embodiments, such as when the control system determines that the failure type cannot or likely cannot be fixed by adjusting one or more operating parameters of the cylinder, the control system may initialize a modified operating mode for the engine.

In some embodiments, the modified operating mode may include a cylinder deactivation (CDA) mode. Cylinder deactivation (CDA) mode is a broad term that encompasses various related but distinct cylinder deactivation operating modes. A first type of CDA operating mode is known as "fixed cylinder CDA." In a fixed cylinder CDA operating mode, the same cylinder(s) are active/inactive each engine cycle during the fixed cylinder CDA operating mode. A second type of CDA operating mode is known as "skip-fire"

or "dynamic skip-fire" (DSF) operating mode. In a DSF CDA mode, one or more cylinders are deactivated/inactive (e.g., combustion does not occur) on a cycle-by-cycle basis. Accordingly, a cylinder may be inactive for a first engine cycle and active for a second engine cycle. An "active" cylinder means that combustion is allowed to occur in that cylinder. An "inactive" or "deactivated" cylinder means that combustion is not allowed to occur in that cylinder. In either of the above described types of CDA operating modes, one or more cylinders may be deactivated until a reactivation condition is met. The reactivation threshold may include a threshold value of torque or power demand on the engine, an increase in torque or power demand, a service event, an indication that a fault code has been cleared, and/or an indication that the deactivated cylinder is not or likely is not compromised. The present disclosure is applicable with each type of CDA operating mode, and the term CDA mode or CDA operating mode is meant to encompass all such operating modes unless indicated otherwise.

Accordingly, the control system may automatically deactivate a cylinder upon detecting and/or determining a mechanical issue and/or a combustion issue. The mechanical issue and/or the combustion issue may be a recurring issue (e.g., an issue that occurs over a predefined period, such as a predefined time period, a predefined number of engine cycles, etc.). Further, the mechanical issue and/or the combustion issue may be specific to a particular cylinder (e.g., at least one cylinder of a plurality of cylinder). As described in more detail herein, the mechanical issue may include one or more of a function of the piston, piston rings, cylinder liner, intake valve, exhaust valve, overhead activation system, fuel injector, glow plug, or spark plug. The issues may result in undesirable outcomes, such as a misfire, a low torque output, a high cylinder-out NOx, a high cylinder-out particulate level, etc.

In some embodiments, the control system may report a compromised or potentially compromised cylinder to one or more remote computing systems. In some embodiments, the controller may be configured to communicatively couple to one or more computing systems external to the engine system such as a cloud computing system. The controller may provide engine data including information indicative of a compromised cylinder to the external computing systems. In some embodiments, the controller may determine that the engine has been tampered with based on one or more parameters exceeding a maximum threshold, being below a minimum threshold, or otherwise not falling within a predefined desired/acceptable range. For example, the controller may determine that the engine system was tampered with or likely tampered with when the controller detects (e.g., by one or more sensors) that a number of cylinders are compromised or potentially compromised is greater than a predefined threshold amount. In some embodiments, the tampering may include an unauthorized adjustment of an air-to-fuel ratio (AFR). Information regarding the tampering may also be provided to one or more remote computing systems.

Now referring to FIG. 1A, a system 100 is shown, according to an example embodiment. The system 100 includes an engine system 118 that includes an engine 101 and an aftertreatment system 120, an operator input/output (I/O) device 130, vehicle subsystems 135, and a controller 140, where the controller 140 is communicably coupled to each of the aforementioned components. In the configuration of FIG. 1, the system 100 is included in a vehicle. The vehicle may be any type of on-road or off-road vehicle including, but not limited to, wheel-loaders, fork-lift trucks, line-haul trucks, mid-range trucks (e.g., pick-up truck, etc.), sedans, coupes, tanks, airplanes, boats, and any other type of vehicle. In another embodiment, the system 100 may be embodied in a stationary piece of equipment, such as a power generator or genset. All such variations are intended to fall within the scope of the present disclosure.

The engine 101 may be any type of internal combustion engine. The engine may generate exhaust gas. The engine 101 may be fueled by gasoline (e.g., a spark-ignited engine), natural gas, diesel fuel, or another type of fuel. In some embodiments, the engine 101 may be a part of a hybrid engine system (e.g., a combination of an internal combustion engine and one or more electric motors). In some embodiments, the engine 101 is configured as a spark-ignition (SI) engine. In other embodiments, the engine 101 is configured as a compression-ignition (CI) engine. In the example depicted, the engine 101 is a diesel-powered compression-ignition engine.

The aftertreatment system 120 may include various components and systems used to reduce exhaust emissions, such as selective catalytic reduction (SCR) catalyst, a diesel oxidation catalyst (DOC), a diesel particulate filter (DPF), a diesel exhaust fluid (DEF) doser with a supply of diesel exhaust fluid, a plurality of sensors for monitoring the aftertreatment system (e.g., a nitrogen oxide (NOx) sensor, temperature sensors, etc.), and/or still other components.

Referring still to FIG. 1A, an operator input/output (I/O) device 130 is also shown. The operator I/O device 130 may be coupled to the controller 140, such that information may be exchanged between the controller 140 and the I/O device 130, wherein the information may relate to one or more components of FIG. 1A or determinations (described below) of the controller 140. The operator I/O device 130 enables an operator of the system 100 to communicate with the controller 140 and one or more components of the system 100 of FIG. 1A. For example, the operator input/output device 130 may include, but is not limited to, an interactive display, a touchscreen device, one or more buttons and switches, voice command receivers, etc. In this way, the operator input/output device 130 may provide one or more indications or notifications to an operator, such as a malfunction indicator lamp (MIL), etc. Additionally, the vehicle may include a port that enables the controller 140 to connect or couple to a scan tool so that fault codes and other information regarding the vehicle may be obtained.

The vehicle subsystems 135 may include one or more components including mechanically driven or electrically driven vehicle components. The vehicle subsystems 135 may include, but are not limited to, an HVAC system, lights, pumps, fans, and so on.

The controller 140 is structured to control, at least partly, the operation of the system 100 and associated sub-systems, such as the engine 101 and the operator input/output (I/O) device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1A, the controller 140 is structured to receive data from one or more of the components shown in FIG. 1A. The structure and function of the controller 140 is further described in regard to FIG. 2.

As the components of FIG. 1A are shown to be embodied in the system 100, the controller 140 may be structured as one or more electronic control units (ECUs), such as one or more microcontrollers. The controller 140 may be separate from or included with at least one of a transmission control unit, an exhaust aftertreatment control unit, a powertrain control module, an engine control module, etc.

As shown, one or more sensors 125 are included in the system 100. The number, placement, and type of sensors included in the aftertreatment system 120 is shown for example purposes only. That is, in other configurations, the number, placement, and type of sensors may differ. The sensors 125 may be exhaust gas emissions constituents sensors (e.g., NOx sensors, temperature sensors, particulate matter (PM) sensors, etc.), flow rate sensors, pressure sensors, some combination thereof, and so on.

The sensors 125 may be located in or proximate to the engine 101, after the engine 101 and before the aftertreatment system 120, after the aftertreatment system 120, in the aftertreatment system (e.g., coupled to one or more components of the aftertreatment system 120, etc.), upstream of the engine 101, etc. It should be understood that the location of the sensors may vary. In one embodiment, there may be sensors 125 located both before and after the aftertreatment system 120. As shown in FIG. 1B, the sensors 125 may be located in or proximate to an intake manifold 102 and/or an exhaust manifold 104 of the engine 101. In one embodiment, at least one of the sensors is structured as exhaust gas constituent sensors (e.g., CO, NOx, PM, SOx, etc. sensors). In another embodiment, at least one of the sensors 125 is structured as non-exhaust gas constituent sensors that are used to estimate exhaust gas emissions (e.g., temperature, flowrate, pressure, etc.). Additional sensors may be also included with the system 100. The sensors may include engine-related sensors (e.g., torque sensors, speed sensors, pressure sensors, flowrate sensors, temperature sensors, etc.). The sensors may further sensors associated with other components of the vehicle (e.g., speed sensor of a turbo charger, fuel quantity and injection rate sensor, fuel rail pressure sensor, etc.).

The sensors 125 may be real or virtual (i.e., a non-physical sensor that is structured as program logic in the controller 140 that makes various estimations or determinations). For example, an engine speed sensor may be a real or virtual sensor arranged to measure or otherwise acquire data, values, or information indicative of a speed of the engine 101 (typically expressed in revolutions-per-minute). The sensor is coupled to the engine (when structured as a real sensor), and is structured to send a signal to the controller 140 indicative of the speed of the engine 101. When structured as a virtual sensor, at least one input may be used by the controller 140 in an algorithm, model, lookup table, etc. to determine or estimate a parameter of the engine (e.g., power output, etc.). Any of the sensors 125 described herein may be real or virtual.

The controller 140 is coupled and, particularly communicably coupled, to the sensors 125. Accordingly, the controller 140 is structured to receive data from one more of the sensors 125 and provide instructions/information to the one or more sensors 125. The received data may be used by the controller 140 to control one more components in the system 100 and/or for monitoring the system 100 and/or controlling one or more components of the system 100.

Now referring to FIG. 1B, a schematic view of a block diagram of the engine 101 of FIG. 1A is shown, according to an example embodiment. The engine 101 includes an intake manifold 102, a cylinder block 103, and an exhaust manifold 104. The cylinder block 103 includes at least one cylinder 110. As shown in FIG. 1B, the cylinder block 103 includes six cylinders 110. However, it should be understood that the engine 101 may include more or fewer cylinders (e.g., 4 cylinders, 8 cylinders, etc.). Further, the cylinders 110 may be arranged in any cylinder configuration (e.g., inline cylinders, V-arrangement, etc.). Also shown in FIG. 1B, the cylinders 110 are separated into a first cylinder group or bank 108 and a second cylinder group or bank 109. It should be understood that they cylinders may be separated into more or fewer groups than as shown in FIG. 1B.

Each cylinder 110 includes at least one corresponding intake valve 112 and at least one corresponding exhaust valve 114. The intake valve 112 is positioned, at least partly, within the cylinder 110 and is configured to selectively open to permit air (or an air mixture that comprises other fluids or gases) to enter the cylinder and to close to prevent air (or an air mixture that comprises other fluids or gases) from entering the cylinder. The exhaust valve 114 is positioned, at least partly, within the cylinder 110 and is configured to open to permit at least exhaust gases from combustion to exit the cylinder. For example, an actuator controlled by the controller 140 may cause the intake valve 112 and/or the exhaust valve 114 to operate between the open position and the closed position. In this way, the intake valve 112 and/or the exhaust valve 114 may be selectively opened or closed to control the amount of air (e.g., ambient air) flowing into the cylinders 110 from the intake manifold 102. For example, in the at least partly open position, the intake valve 112 allows air (e.g., ambient air) to flow into the cylinder 110 from the intake manifold 102. In the closed position, the intake valve 112 prevents or substantially prevents air from flowing into the cylinder 110. In the open position, the exhaust valve 114 allows exhaust gas to flow out of the cylinder 110 and to the exhaust manifold 104. In the closed position, the exhaust valve 114 prevents or substantially prevents exhaust gases (or other trapped gases) from flowing out of the cylinder 110.

The intake manifold 102 may be structured to route ambient air to the cylinder block 103. In some embodiments, the intake manifold 102 includes an intake air throttle (IAT) valve 106 for controlling the flow of ambient air or charge air to the cylinder bock 103. The IAT valve 106 may be operable between a closed position and an open position. For example, an actuator controlled by the controller 140 may cause the IAT valve 106 to operate between the open position and the closed position. In this way, the IAT valve 106 may be positioned to control the amount of air (e.g., ambient air) flowing into the intake manifold 102. In some embodiments, the intake valve(s) 112 may be positioned within the intake manifold 102 such that each of the intake valves 112 controls the flow of air from the intake manifold 102 to a corresponding cylinder 110 of the cylinder block 103.

The exhaust manifold 104 may be structured to route exhaust gases from the cylinder block 103 to the aftertreatment system 120. In some embodiments, the exhaust manifold 104 may include one or more exhaust valves for controlling the flow of air from the cylinder block 103 to the aftertreatment system 120. In some embodiments, each of the one or more exhaust valves controls the flow of air to a corresponding cylinder 110 of the cylinder block 103.

Figure 2:
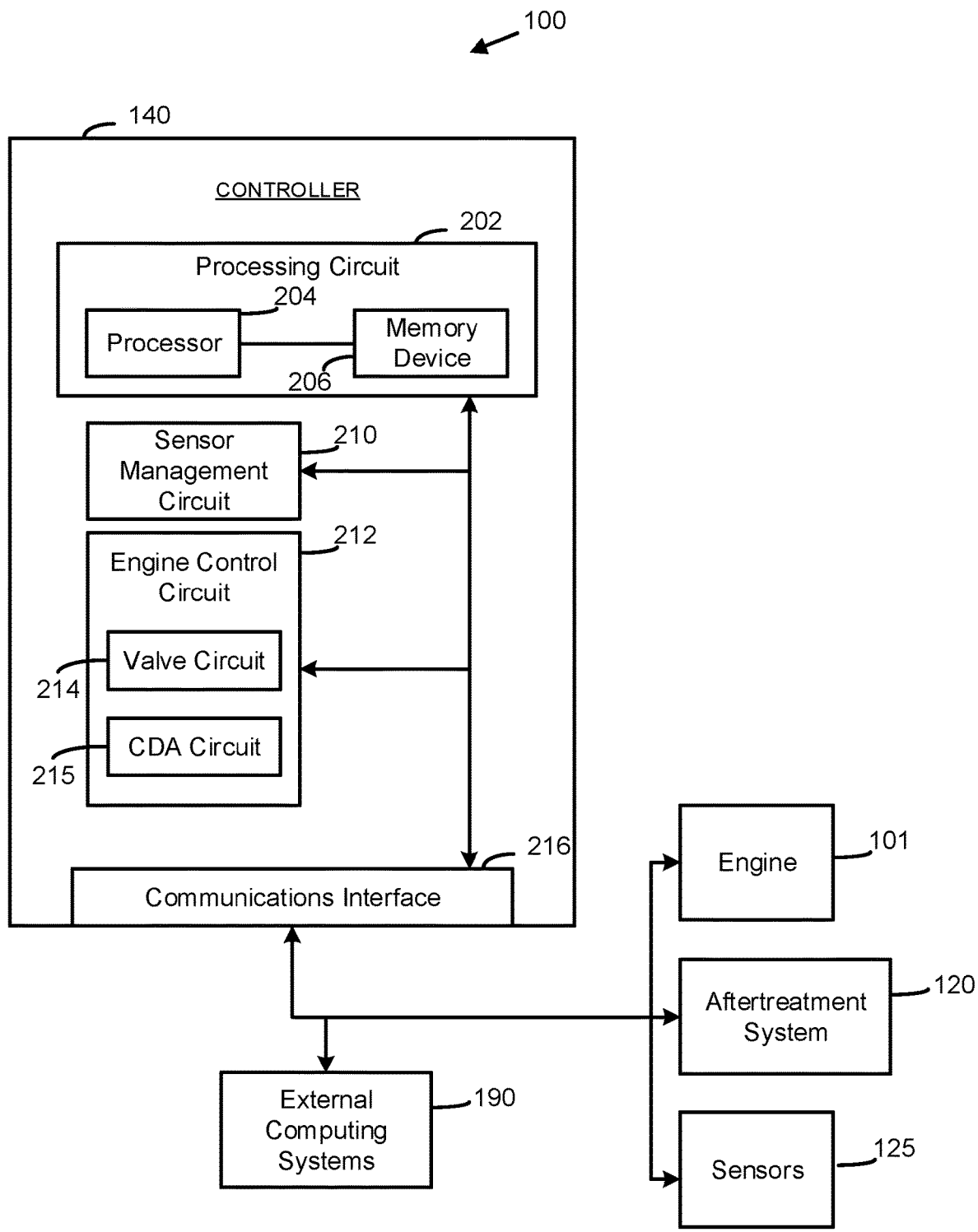
FIG. 2 is a block diagram of the controller of FIG. 1A, according to an example embodiment.

Now referring to FIG. 2, a schematic diagram of the controller 140 of the system 100 of FIG. 1 is shown, according to an example embodiment. As shown, the controller 140 includes at least one processing circuit 202 having at least one processor 204 and at least one memory device 206, a sensor management circuit 210, an engine control circuit 212, and a communications interface 216. The controller 140 is structured to monitor the engine 101 and the aftertreatment system 120 and enable a modified engine operating mode based on monitoring the engine and/or the aftertreatment system 120. More specifically, the controller 140 may determine one or more compromised or potentially compromised cylinders and cause the engine 101 to operate in the modified engine operating mode such that the engine 101 meets or attempts to meet one or more operating objectives yet mitigates against continued use of the potentially compromised cylinder(s) to prevent potential further damage.

In one configuration, sensor management circuit 210 and/or the engine control circuit 212 are embodied as machine or computer-readable media storing instructions that are executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the sensor management circuit 210 and/or the engine control circuit 212 are embodied as hardware units, such as one or more electronic control units. As such, the sensor management circuit 210 and/or the engine control circuit 212 may be embodied as one or more circuitry components including, but not limited to, processing circuitry, network interfaces, peripheral devices, input devices, output devices, sensors, etc. In some embodiments, the sensor management circuit 210 and/or the engine control circuit 212 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the sensor management circuit 210 and/or the engine control circuit 212 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The sensor management circuit 210 and/or the engine control circuit 212 may also include or be programmable hardware devices such as field programmable gate arrays, programmable array logic, programmable logic devices or the like. The sensor management circuit 210 and/or the engine control circuit 212 may include one or more memory devices for storing instructions that are executable by the processor(s) of the sensor management circuit 210 and/or the engine control circuit 212. The one or more memory devices and processor(s) may have the same definition as provided below with respect to the memory device 206 and processor 204. In some hardware unit configurations, the sensor management circuit 210 and/or the engine control circuit 212 may be geographically dispersed throughout separate locations in the vehicle. Alternatively and as shown, the sensor management circuit 210 and/or the engine control circuit 212 may be embodied in or within a single unit/housing, which is shown as the controller 140.

In the example shown, the controller 140 includes the processing circuit 202 having the processor 204 and the memory device 206. The processing circuit 202 may be structured or configured to execute or implement the instructions, commands, and/or control processes described herein with respect to the sensor management circuit 210 and/or the engine control circuit 212. The depicted configuration represents sensor management circuit 210 and/or the engine control circuit 212 being embodied as machine or computer-readable media storing instructions. However, as mentioned above, this illustration is not meant to be limiting as the present disclosure contemplates other embodiments where at least one of the sensor management circuit 210 and/or the engine control circuit 212, is configured as a hardware unit. All such combinations and variations are intended to fall within the scope of the present disclosure.

The processor 204 may be implemented as one or more single- or multi-chip processors, digital signal processors (DSPs), application specific integrated circuits (ASICs), field programmable gate arrays (FPGAs), and/or suitable processors (e.g., other programmable logic devices, discrete hardware components, etc. to perform the functions described herein). A processor may be a microprocessor, a group of processors, etc. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the sensor management circuit 210 and/or the engine control circuit 212 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. For example, the memory device 206 may include dynamic random-access memory (DRAM). The memory device 206 may be communicably connected to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The communications interface 216 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 216 may include an Ethernet card and port for sending and receiving data via an Ethernet-based communications network and/or a Wi-Fi transceiver for communicating via a wireless communications network. The communications interface 216 may be structured to communicate via local area networks or wide area networks (e.g., the Internet) and may use a variety of communications protocols (e.g., IP, LON, Bluetooth, ZigBee, radio, cellular, near field communication).

In some embodiments, the communications interface 216 may be structured to communicatively couple with an external computing systems 190. The external computing systems 190 may be external to the system 100 and may include at least one of a cloud computing system or other external computing system. The external computing systems 190 may be associated with a manufacturer of the system 100 or components thereof (e.g., an OEM), a customer of the manufacturer, an operator of the system 100 such as a fleet operator, a service/technician computing system, a government agency (e.g., an emissions compliance agency, etc.), and/or any other group or individual. Accordingly, the controller 140 may selectively provide information to the external computing systems 190 via the communications interface 216 for remote tracking, diagnostic, and other purposes.

The sensor management circuit 210 is structured or configured to control the operation of the sensors 125. For example, the sensor management circuit 210 may be structured to generate one or more control signals and transmit the control signals to one or more sensors 125 (e.g., to acquire data, etc.). The control signals may cause the one or more sensors 125 to sense and/or detect the sensor data and/or provide the sensor data to the sensor management circuit 210. In some embodiments, the sensor management circuit 210 may be structured to estimate the sensor data (e.g., when the sensors 125 are virtual sensors). The "sensor data" may include temperature data (e.g., fluid temperature such as exhaust gas temperature or engine oil temperature, component temperature such as engine temperature, etc.), flow rate data (e.g., exhaust gas flow rate data, charge air flow rate, etc.), pressure data (e.g., engine cylinder pressure, coolant pressure, etc.), and/or other data related to the operation of the system 100.

The engine control circuit 212 is structured to control, at least partly, operation of the engine system 118 (e.g., the engine 101, the aftertreatment system 120, and/or components thereof). For example, the engine control circuit 212 may be structured to adjust the operation of one or more components of the engine 101, such as the cylinders 110. In some embodiments, the engine control circuit 212 includes a valve circuit 214 and a CDA circuit 215.

The valve circuit 214 is structured or configured to control operation of the IAT valve 106, the intake valves 112, and/or the exhaust valves 114. For example, the valve circuit 214 may control one or more actuators for adjusting the position of the IAT valve 106, the intake valves 112, and/or the exhaust valves 114 (e.g., between an open position and a closed position). In some embodiments, the valve circuit 214 is configured to adjust a valve timing (e.g., when the actuator causes a valve to open or close) and/or adjust an intake valve lift (e.g., a position of the valve when the valve is opened by the actuator). In some embodiments, the valve circuit 214 may close one or more of the intake valves 112 in order to deactivate a cylinder for CDA by preventing air or charge air from entering that cylinder. In some embodiments, the valve circuit 214 is configured to selectively open/close intake valves 112 and/or exhaust valves 114 to switch between active and deactivated cylinders.

The CDA circuit 215 is structured or configured to control operation of CDA mode for the engine. The CDA circuit 215 may command the valves, such as the intake valves, to close to deactivate a cylinder (or, command the valve circuit 214 to close the intake valves to deactivate a cylinder and at least partly open the intake valves to activate a cylinder). The CDA circuit 215 may additionally control the operation of a fueling system of the engine 101. In some embodiments, the CDA circuit 215 may adjust a fuel injection value (e.g., a fuel injection amount, a fuel injection timing, etc.) of a fuel injector. For example, the CDA circuit 215 may control a fuel injector to change the amount and/or timing of fuel supplied to a cylinder. In some embodiments, the CDA circuit is configured to disable a fuel injection in order to deactivate a cylinder. In some embodiments, the CDA circuit 215 may adjust a spark ignition value (e.g., a spark timing, a spark duration, etc.) of a spark assist device to enable CDA in spark-ignition engines (disable the spark assist device for one or more cylinders chosen to be deactivated).

In some embodiments, the engine control circuit 212 may cause the engine 101 to operate in a modified operating mode responsive to determining that one or more cylinders 110 are or are likely compromised. The modified operating mode may include adjusting one or more parameters of the operation of one or more cylinders 110 and/or deactivating the one or more cylinders 110 that are compromised or are likely compromised as part of initiating a CDA/DSF operating mode for the engine. In particular, the valve circuit 214 and/or the CDA circuit 215 are structured to modify the operation of one or more components of the engine system 118. As briefly described above, the valve circuit 214 may control the operation of the IAT valve 106, the intake valves 112 and/or the exhaust valves 114. In non-CDA/DSF mode operation, both the intake valve 112 and the exhaust valve 114 selectively open and close during engine cycles to allow air to enter the cylinder, undergo combustion, and direct exhaust gases out of the active cylinder. When the engine system is in CDA/DSF mode, the intake valve 112 of a deactivated cylinder may remain closed thereby preventing at least air from entering the deactivated cylinder and being combined with fuel to cause combustion. In some embodiments, the exhaust valve 114 of a deactivated cylinder remains closed, as no exhaust gases are being generated in the deactivated cylinder. In other embodiments, during CDA/DSF mode, the intake valves 112 and exhaust valves 114 of a deactivated cylinder are allowed to selectively open and close akin to operation during non-skip-fire CDA mode, but combustion does not occur due to no fuel being injected to the deactivated cylinder (compression ignition engines) or a spark being commanded at the deactivated cylinder (spark-ignition engines) (e.g., by the CDA circuit 215). In these embodiments, air circulates through the deactivated cylinders but does not combust. Relative to a normal or non-modified operating mode, thus, the modified operating mode may cause different operational parameters that may be desired according to a received operational objective (e.g., keep emissions below a predefined value, etc.).

Advantageously, the engine control circuit 212 may cause the engine 101 to operate in the modified operating mode to enable the system 100 to achieve or attempt to achieve an operational objective even if one or more of the cylinders 110 are compromised. The modified operating mode may prevent the compromised cylinder(s) 110 from becoming worse and/or from negatively impacting the performance of the engine 101 or system overall (e.g., causing undesired emissions, etc.). The negative impacts may include increasing exhaust emissions above a predefined maximum threshold value, increasing engine vibration above a predefined maximum threshold value, decreasing fuel economy below a predefined minimum threshold value, and so on. For example, the modified operating mode may decrease noise, vibration, and harshness (NVH) associated with a compromised cylinder 110 and protect mechanical components of the engine 101.

The controller 140 may determine that one or more cylinders are compromised or potentially compromised based on data corresponding to the cylinders 110 (e.g., "cylinder data"). The cylinder data may include information indicative of a mechanical issue with the cylinder 110 (e.g., an issue with a function of a piston, a piston ring, a cylinder liner, etc.). For example, a piston ring issue may result in insufficient compression for combusting the air-fuel moisture in a cylinder 110. In some embodiments, when the engine is configured as a SI engine, the cylinder data may include information indicative of a mechanical issue with the cylinder 110 (e.g., an issue with a function of a piston, a piston ring, a cylinder liner, a spark plug, a glow plug, etc.). In any of the above described embodiments (e.g., in either a CI engine or an SI engine), the cylinder data may include information indicative of a mechanical or other issue with the cylinder 110 (e.g., an issue with the intake valve 112, the exhaust valve, a fuel injector, an overhead activation system, etc.) that adversely affects operation of the cylinder(s).

As an example, a fuel injector may be configured to provide a predefined amount of fuel at a predefined fuel injection timing to one of the cylinders 110. The controller 140 may determine that a fuel injector is faulty based on determining at least one of the fuel injector is providing fuel above a predefined amount, the fuel injector is providing fuel below a predefined amount, the fuel injector is providing fuel at an incorrect fuel injector timing, fuel is leaking or "dribbling" out of the fuel injector, and/or other issues corresponding to the fuel injector (e.g., via one or more fuel pressure and/or flow sensors). As another example, an issue with an intake valve 112 and/or an exhaust valve may include a valve activation issue where a valve is stuck in a position (e.g., a closed position, an open position, or therebetween). Further examples of compromised or potentially compromised cylinders may include a cylinder misfire (e.g., based on a knock sensor reading), a decreased cylinder torque output, a high cylinder-out NOx, and/or a high cylinder-out particulate level. In some embodiments, the controller 140 may determine that one or more cylinders 110 are compromised, are potentially compromised, or will likely become compromised based on comparing the cylinder data to one or more thresholds. In some embodiments, the cylinder data may include sensor data such as an engine torque output, an engine speed, and/or an exhaust manifold pressure. The controller 140 may determine that one or more cylinders 110 are compromised, are potentially compromised, or will likely become compromised based on comparing the engine torque output to a requested torque amount (e.g., the requested torque amount is a minimum threshold). If the engine torque output is less than the requested torque amount, the controller 140 may determine that the one or more cylinders 110 are compromised, are potentially compromised, or will likely become compromised. In some embodiments, an engine position and/or a speed sensor of a crank may be used to measure an engine speed (e.g., an engine RPM). The controller 140 may determine that the one or more cylinders 110 are compromised, are potentially compromised, or will likely become compromised based on fluctuations in engine speed (e.g., detecting "roughness" in an engine speed signal). In some embodiments, a pressure value, such as an engine cylinder pressure, an exhaust manifold pressure, etc. may be detected by a pressure sensor or determined by a virtual sensor. One or more of the pressure values may be "pulses" or changes in pressure that correspond to cylinder firing events. The pressure values may be compared to a pressure threshold to determine if a particular cylinder 110 is compromised, is potentially compromised, or will likely become compromised. In yet another embodiment, the pressure value may be a crankcase pressure value. If the crankcase pressure value exceeds a maximum crankcase pressure threshold, the controller 140 may determine that the one or more cylinders 110 are compromised, are potentially compromised, or will likely become compromised.

As indicated above, the cylinder data may include sensor data (e.g., data received from the sensors 125). Accordingly, the cylinder data may include one or more operational parameters regarding the engine system (e.g., a target air-fuel ratio, a target fuel pressure, a target fuel amount, a target engine or cylinder temperature, a target cylinder pressure, etc.). In some embodiments, the sensor data may include data from sensors 125 that are physically separated from the cylinders 110, but that corresponds to an input or an output of one or more cylinders. The sensor data may include an exhaust gas constituent value (e.g., a NOx value, an oxygen value, a particulate matter value, etc.), an exhaust gas temperature value, an exhaust gas pressure value, a cylinder pressure value, a cylinder air intake value, and/or other data indicative of one of the above described types of compromised cylinders. Additional and/or alternative examples of sensor data include a cylinder pressure value, a crankcase blowby gas value (e.g., temperature value, pressure value, flow rate value, etc.), a pressure value at the exhaust manifold 104, and so on.

In some embodiments, the sensor data may include data that corresponds to each cylinder 110. As shown in FIG. 1B, a sensor 125 may be positioned at the intake manifold 102 and/or the exhaust manifold 104. In these embodiments, the sensors 125 may be configured to detect sensor data such that the controller 140 can correlate the sensor data with a particular cylinder 110. For example, the sensors 125 may be configured to detect the sensor data such that the controller 140 can associate the sensor data with a firing event of a corresponding cylinder 110. In other embodiments, a sensor 125 may be positioned at an inlet and/or an outlet of each cylinder 110 in order to acquire sensor data specific to each cylinder 110 or a subset of the cylinders.

The controller 140 may compare cylinder data, which may include sensor data that corresponds to a particular cylinder 110, with a respective predefined cylinder threshold to determine whether the particular cylinder 110 is compromised or potentially compromised. In some embodiments, the controller 140 may isolate one or more cylinders for analyzing the cylinder data corresponding to the one or more of the isolated cylinders. In some embodiments, the sensors 125 may be configured as "fast" sensors that are capable of detecting sensor data that corresponds to a firing event of a desired cylinder (where "fast" corresponds with a data acquisition rate being above a predefined threshold), such that the fast sensors may isolate sensor data from each of the cylinders 110. The sensor data from the fast sensors may include an emissions value (e.g., a NOx output value, an oxygen output value, etc.), a temperature value, a pressure value, etc. that corresponds to an isolated/desired cylinder. In some embodiments, the fast sensors are positioned within the exhaust manifold 104 such that the sensors 125 may detect sensor data from each of the cylinders 110, and the controller 140 may determine an EONOx value on a per-cylinder basis. For example, the controller 140 may compare a NOx output of an isolated cylinder 110 to a cylinder NOx threshold. In another example, the controller 140 may compare a temperature and/or pressure value of an isolated cylinder 110 to a cylinder temperature threshold and/or a cylinder pressure threshold, respectively. If the cylinder data of a cylinder 110 does not satisfy the corresponding cylinder threshold (e.g., greater than a maximum threshold, less than a minimum threshold, or not within a threshold range), the controller 140 may determine that the cylinder 110 is compromised or potentially compromised. If the cylinder data of a cylinder 110 satisfies the corresponding cylinder threshold (e.g., less than a maximum threshold, greater than a minimum threshold, or within a threshold range), the controller 140 may determine that the cylinder 110 is not or likely is not compromised.

In some embodiments, the engine control circuit 212 may be configured to determine if one or more cylinders 110 is compromised or potentially compromised by using an intrusive diagnostic process. An intrusive diagnostic process refers to a forced manipulation of one or more components that may cause the one or more components to operate outside of a predefined calibrated operating range. Intrusive diagnostics may be performed in service bays. In contrast, a passive diagnostic may be performed while the engine system/vehicle is in-operation (i.e., it runs/executes in the background). For example, based on detecting that one or more engine outputs (e.g., EONOx, engine output torque or power, engine temperature) exceeds a threshold, the engine control circuit 212 may use an intrusive diagnostic process to determine a specific cylinder or cylinders that are causing the outputs to exceed the threshold(s). In an example embodiment, the engine control circuit 212 may selectively deactivate one or more cylinders 110 according to a predetermined sequence of cylinder deactivation patterns. For example, the engine control circuit 212 may deactivate each of the cylinders 110 in the predetermined sequence for a predetermined period (e.g., a time period, a number of engine cycles, a number of cylinder cycles, etc.).

As an example, when the engine includes six cylinders 110, the engine control circuit 212 may isolate each cylinder 110 to determine whether a cylinder is compromised or likely compromised. The engine control circuit 212 may deactivate a first cylinder for a predetermined period. The engine control circuit 212 may receive first sensor data corresponding to the first cylinder being deactivated (e.g., data corresponding to the active cylinders). After the predetermined period, the engine control circuit 212 may deactivate a second cylinder for the predetermined period and receive second sensor data corresponding to the second cylinder being deactivated. The engine control circuit 212 may continue deactivating each cylinder 110, individually, until each of the six cylinders 110 have been deactivated, and the engine control circuit 212 has received sensor data corresponding to each of the cylinders 110 being deactivated. As described above, the sensor data may include a temperature value, a pressure value, an emissions value, etc. The sensor data may correspond with each active cylinder, individually, and/or with a cumulative output of all the active cylinders. If an undesired occurrence fails to occur that was occurring when a cylinder is deactivated (e.g., emissions above a predefined threshold), the controller 140 may isolate the potential compromise (e.g., failure) to that particular cylinder. If unidentified, the controller 140 may next deactivate two cylinders at a time and then three cylinders at a time to progressively function to identify one or more potentially compromised cylinders.

In this regard, the engine control circuit 212 may receive cylinder data corresponding to the active cylinders for each cylinder deactivation pattern of the predetermined sequence, and compare the cylinder data to one or more thresholds. For example, the engine control circuit 212 may compare a NOx output of the active cylinders to a NOx threshold, a temperature output of the active cylinders to a temperature threshold, and so on. Based on comparing the cylinder data to the one or more thresholds, the engine control circuit 212 may determine whether deactivating the one or more cylinders resolved the problem. Responsive to determine that deactivating the one or more cylinders 110 resolved the problem (e.g., reduced emissions to below the predefined threshold), the engine control circuit 212 may determine that the deactivated cylinders 110 are compromised or potentially compromised (e.g., a NOx output being above a threshold when a cylinder is active to being below a threshold when the cylinder is deactivated may indicate a problem with that cylinder). For example, if deactivating the second cylinder of the six cylinder engine 101 resulted in a cylinder data value, which previously exceeded a corresponding threshold, falling below the corresponding threshold, the engine control circuit 212 may determine that the second cylinder is compromised. As a specific example, if deactivating the second cylinder of the six cylinder engine 101 resulted in the cumulative NOx value of the active cylinders falling below a NOx threshold, the engine control circuit 212 may determine that the second cylinder is compromised or potentially compromised.

In some embodiments, based on comparing the cylinder data to the one or more thresholds, the engine control circuit 212 may determine whether one or more of the active cylinders corresponds to the problem/issue. Responsive to determining that one or more of the active cylinder corresponds to the problem, the engine control circuit 212 may determine that the active cylinders 110 are compromised or potentially compromised. For example, if deactivating cylinders 1 and 3-6 of the six cylinder engine 101 did not result in a cylinder data value, which previously exceeded a corresponding threshold, falling below the corresponding threshold the engine control circuit 212 may determine that the second cylinder is compromised.

In some embodiments, the engine control circuit 212 may determine that one or more cylinders 110 will potentially become compromised based on the cylinder data. For example, the engine control circuit 212 may determine that a cylinder will potentially become compromised based on comparing the cylinder data with one or more thresholds associated with an indication of potential future failure or issues. The cylinder data may include a cylinder pressure value, a crankcase blowby gas value (e.g., temperature value, pressure value, flow rate value, etc.), a pressure value at the exhaust manifold 104, and so on. Based on comparing the cylinder data with one or more thresholds, the engine control circuit 212 may determine that one or more cylinders 110 have degraded and will potentially become compromised (in this instance, experience a failure) in the future. For example, the cylinder data may exceed, fall below, or within a range indicative of operational capability at the particular instant but indicative of future failures. These thresholds may be stored in a look-up table and retrieved by the circuit 212. In comparison, if the cylinder data exceeds, falls below, or is outside a range indicative of operational capability and not desired, the controller may determine that the cylinder data indicates a compromised cylinder(s). Regarding the former and the latter situation as described herein, the engine control circuit 212 may take a preemptive action to preserve a health of one or more cylinders 110 (i.e., mitigate against the potential failure). The preemptive action may include activating a CDA operating mode where the one or more cylinders 110 that may become compromised are deactivated. The CDA operating mode may be temporary (e.g., for a predetermined time period or number of engine cycles) or until a reactivation condition is received or met. Beneficially, the CDA operating mode may mitigate against further degradation with the one or more compromised or likely compromised cylinders.

In some embodiments, engine control circuit 212 may be configured to adjust the one or more operational parameters of the compromised or potentially compromised cylinders 110. In some embodiments, the engine control circuit 212 may adjust one or more parameters of the IAT valve 106, the intake valves 112 and/or the exhaust valves 114 (e.g., adjusting an intake valve timing and/or adjusting an intake valve lift by the valve circuit 214). In some embodiments, the engine control circuit 212 may adjust a fuel value (e.g., adjusting a fuel injection quantity, adjusting a fuel injection timing by the CDA circuit 215).

In some embodiments, the engine control circuit 212 may adjust a dosing strategy in the aftertreatment system 120 (e.g., if the controller 140 determines that the cylinder 110 has not mechanically become compromised or potentially mechanically compromised and an emissions output of one or more cylinders 110 exceeds a threshold value). Adjusting the dosing strategy in the aftertreatment system may include causing a dosing module (doser) of an aftertreatment system to adjust a dosing value (e.g., a dosing amount, a dosing timing, a dosing concentration, etc.). For example, a dosing amount may be increased responsive to determining that an EONOx value is above a threshold value and that the cylinder 110 has not mechanically become compromised or potentially mechanically compromised.

In some embodiments, the engine control circuit 212 may adjust a variable-geometry turbocharger for one or more cylinder events. For example, the engine control circuit 212 may adjust one or more veins of a turbine of a turbocharger. The veins may be adjusted for each cylinder firing event. In some embodiments, adjusting the VGT may enable more restriction on airflow thereby decreasing the airflow. In other embodiments, adjusting the VGT may enable less restriction on airflow thereby increasing the airflow.

In some embodiments, the engine control circuit 212 may cause the engine 101 to operate in a cylinder deactivation (CDA), and particularly a dynamic skip-fire (DSF), mode by selectively deactivating one or more of the cylinders 110. In some embodiments, deactivating one or more cylinders 110 may include deactivating a fuel injector, closing an air intake valve, and/or closing an air exhaust valve that corresponds to the one or more cylinders 110. The engine control circuit 212 may deactivate the one or more cylinders 110 that are compromised or potentially compromised. The one or more deactivated cylinders 110 may remain deactivated until the engine control circuit 212 causes the one or more deactivated cylinders 110 to reactivate. Cylinder reactivation is described in more detail herein.

In some embodiments, the one or more cylinders 110 are deactivated responsive to detecting a recurring issue in the one or more cylinders 110. The engine control circuit 212 may determine that the one or more cylinders 110 has a "recurring issue" based on analyzing the cylinder data and determining that the one or more cylinders 110 are compromised or potentially compromised for at least a predetermined period (e.g., a predetermined time period, a predetermined number of engine cycles, a predetermined number of cylinder firing events, etc.) (i.e., as compared to an instant cylinder data indicating a potential compromise). For example, the engine control circuit 212 may determine that a cylinder 110 is potentially compromised based determining that cylinder data of the cylinder 110 exceeds one or more thresholds for a predetermined period to designate the issue as a recurring issue (e.g., a cylinder temperature has been higher than the associated cylinder temperatures of the engine for more than a predefined amount of time or cycles and by more than a predefined amount). The engine control circuit 212 may monitor the potentially compromised cylinder 110 for the predetermined period. The engine control circuit 212 may determine that the cylinder is compromised based on the determining that cylinder data of the cylinder 110 exceeds one or more thresholds (or otherwise does not satisfy a desired operating range for the parameter) for the duration of the predetermined period.

In some embodiments, the engine control circuit 212 may cause the engine 101 to operate in a DSF mode. In the DSF mode the one or more cylinders 110 that are compromised or potentially compromised may be temporarily deactivated and reactivated during the DSF mode. For example, the one or more compromised or potentially compromised cylinders 110 may be deactivated for a predetermined period (e.g., a predetermined time period, a predetermined number of engine cycles, a predetermined number of cylinder firing events, etc.) and activated after the predetermined period. In some embodiments, the DSF mode may include selectively activating and deactivating the one or more cylinders 110 that are compromised or potentially compromised in a predetermined pattern or patterns. For example, the one or more cylinders 110 that are compromised or potentially compromised may be deactivated for a first number of cycles and activated for a second number of cycles.

In the CDA mode and/or the DSF mode, the engine control circuit 212 may control the active cylinders 110 to meet an operational objective (e.g., a torque demand) of the engine 101 and/or system overall. For example, the one or more operational objectives may include an emissions value (e.g., a SONOx value, a deNOx value, etc.), a mechanical load (e.g., a torque value or target, a vibrations value, etc.), and/or a fuel economy (e.g., fuel consumption per distance (gallons per mile, distance traveled per unit fuel (miles per gallon), etc.). These objectives may be received from a remote source (e.g., external computing system) and/or via the operation I/O device. In some embodiments, the engine control circuit 212 may adjust one or more parameters of a DSF mode to meet the operating objectives of the system 100. For example, the engine control circuit 212 may adjust a "fire fraction" of the engine 101. As used herein and in one embodiment, the phrase "firing fraction" as used with respect to the cylinders 110 of the engine 101 and CDA/DSF operating mode refers to the number of cylinders 110 active as a fraction of the total number of cylinders 110 available. For example and in this embodiment, a firing fraction of 4/6 refers to four cylinders being active out of a total of six cylinders. In another embodiment, "firing fraction" refers to the times the cylinders are fired divided by the number of firing opportunities (e.g., number of engine cycles multiplied by the number of cylinders in the engine). For example, if a 6-cylinder engine is fired 9 times in 3 engine cycles, the firing fraction is 9/18 or ½. Firing fraction adjustments allow for the number of cylinders 110 being fired (on average) to be modified by a fractional amount instead of a whole number. For example, a firing fraction may change from ⅓ to ⅖ which is equivalent to, in a 6-cylinder engine, increasing from 2 cylinders to 2.4 cylinders. Accordingly, the controller 140 may use a lookup table that includes DSF firing patterns. The controller 140 may select a DSF firing pattern that corresponds to the deactivation of the identified problem cylinder 110 while enabling the system 100 to achieve the operating objectives (e.g., a desired power output, fuel economy, exhaust gas temperature for emissions purposes, etc.). For example, the lookup table may include non-modified DSF firing patterns that define non-modified firing fractions (e.g., one half) and modified DSF firing patterns that define a modified firing fraction (e.g., 3/7) such that the problem cylinder 110 is always deactivated and enables the engine 101 to achieve or attempt to achieve the operating objectives of the system 100. In some embodiments, the fire fraction enables the cylinders 110 that are not compromised to continue operating above a predefined frequency such that the non-compromised cylinders 110 are not damaged due to a vacuum forming within the cylinder 110.

In some embodiments, the engine control circuit 212 may adjust one or more operational parameters of the cylinders 110 to enable the engine 101 to operate at a target engine output despite the absence of the deactivation of one or more cylinders 110. For example, the engine control circuit 212 may adjust one or more of a cylinder fueling value (e.g., an air-fuel ratio, a fuel amount, a fuel injection timing, etc.), an engine speed, an exhaust gas recirculation (EGR) value, and/or other parameters to enable the engine 101 to operate at the target engine output (which may be based on the operational objective). In some embodiments, the engine control circuit 212 may be configured to adjust the operational parameters of one or more active cylinders 110. For example, the engine control circuit 212 may only increase the fueling in one or more active cylinders 110 to compensate for the one or more deactivated cylinders 110. The engine control circuit 212 may adjust a combustion firing density and/or firing pattern to allow for meeting operator torque requests despite the absence of the deactivated cylinder 110. In some embodiments, the engine control circuit 212 may adjust an ERG value based on the DSF firing pattern to maintain a minimum EGR availability in order to meet the operating objectives.

In some embodiments, the engine control circuit 212 may enable a motor generator to provide supplement torque pulses. The torque pulses may be provided at or nearly at the same time a deactivated cylinder 110 would have fired such that the total torque output of the engine 101 and the motor generator does not decrease (or decreases in an amount that is unnoticeable to an operator) because of the deactivated cylinder 110.

In some embodiments, the engine control circuit 212 may adjust a variable valve timing (VVT) of the engine 101 (when the engine is equipped with a VVT system). For example, the engine control circuit 212 may close the valves completely. In another example, the engine control circuit 212 may advance or retard the VVT to compensate for one or more identified problems of the compromised cylinder 110. The engine control circuit 212 may determine whether to advance or retard the VVT based on the determined failure or the predicted failure of the compromised cylinder 110.

In some embodiments, the engine control circuit 212 may reactivate the one or more deactivated cylinders 110 based on a received, detected, or determined reactivation condition being met (e.g., by causing the engine 101 to operate in a normal or non-modified operating mode, such as by turning off the CDA/DSF mode(s), etc.). The reactivation condition may be receiving an indication of a service event, which may indicate that the compromised cylinder(s) have been addressed. The reactivation condition may be an indication that a fault code or other indicator associated with a compromised cylinder has been cleared (e.g., by an authorized repair technician). The reactivation condition may therefore include determining that the compromise of one or more deactivated cylinders 110 has been resolved as described according to various examples below and herein.

In some embodiments, the engine control circuit 212 may reactivate the one or more deactivated cylinders 110 responsive to an override condition (i.e., disable the CDA operating mode). When an override condition is present, the controller 140 may disable the modified operating mode to meet one or more operational objectives. The override condition refers to a condition identified by the controller 140 in which the controller 140 determines that a CDA mode should be suspended (e.g., indefinitely or temporarily). Examples of override conditions are described herein below.

In some embodiments, the reactivation (based on the override condition) is temporary (e.g., for a predetermined time, predetermined number of cycles, or until the override condition ceases/stops/is no longer meet). In some embodiments, the engine control circuit 212 may change the modified engine operating mode in response to the override condition. For example, engine control circuit 212 may change the modified engine operating mode from a CDA mode to a DSF mode. The engine control circuit 212 may periodically or in real-time (e.g., continuously, every second, every millisecond, etc.) check if the override condition is met. The override condition may include a high engine load (e.g., an engine load being at or above a predefined high engine load threshold), a mission of the system 100, and/or other conditions where the engine 101 requires all cylinders 110 to be active to achieve a target torque or power output.

As briefly described above, an override condition may be based on a mission of the system 100. The "mission" of the system 100 refers to an activity performed by the system 100. The mission and/or one or more characteristics of the mission may define an operating objective of the system 100. For example, the one or more mission-defined operating objectives may include powering a vehicle to drive to a destination, a fuel economy for a route of the vehicle, an emissions goal for a route of the vehicle, etc. The controller 140 may identify one or more predefined characteristics of the mission as being associated with a "critical mission," "critical situation," or "adverse situation," whereby the mission or situation involves a risk of damage to the system 100, risk of injury to a person, and/or risk of damage to property. Examples of predefined characteristics of missions or situations may include a situation when the system 100 is in imminent danger (e.g., located on a train track), an emergency situation (e.g., if the system 100 is embodied in a fire engine, an ambulance, a military vehicle, etc.), and/or a working mission (e.g., if the system 100 is embodied in a cement mixer, on a vehicle driving at highway speeds, in a vehicle driving uphill or downhill, in a vehicle that has a high load, etc.). For example, if the characteristic of a mission of the system 100 is associated with a predefined critical mission, the engine control circuit 212 may override the modified engine operating mode. In these embodiments, completing the mission may be more important than any damage caused to the engine 101 (or system) by the compromised cylinder(s) 110, or more important than any increased exhaust gas emissions caused by the compromised cylinder(s) 110 (e.g., more important to get the vehicle to a certain destination than damage to the engine that may be caused by the one or more compromised cylinders).

In some embodiments, the engine control circuit 212 may determine a severity of the compromise of the one or more cylinders 110. The severity may be determined based on comparing the cylinder data to one or more thresholds (e.g., a low severity threshold, a moderate severity threshold, a high severity threshold, etc.). When a fault code/indicator is used to identify a compromised or potentially compromised cylinder(s), the engine control circuit 212 may use a predefined list of fault codes that correspond to low, moderate, and high severity ratings/values. In this way, the controller utilize fault codes, MILs, or other indicators that are specific to each cylinder (e.g., based on cylinder pressure sensor readings for each cylinder) to diagnose each cylinder. For example, an injection timing issue and/or a fuel injection amount issue (e.g., injecting a fuel amount above a maximum threshold or below a minimum threshold) may correspond to a low severity. In some embodiments, if one or more values of the cylinder data exceed a corresponding threshold by a predefined amount, the engine control circuit 212 may determine that the severity of the compromised cylinder is high. If one or more values of the cylinder data exceed a corresponding threshold by less than the predefined amount, the engine control circuit 212 may determine that the severity of the compromised cylinder is moderate or low. For example, a high cylinder NOx value may correspond to a high severity if the cylinder NOx value is more than a predefined amount (e.g., 10%) greater than the threshold value. In an additional example, a structural issue with the cylinder 110, such as a cylinder ring failure, a hole in the cylinder, etc., may correspond to a high severity. In some embodiments, for low or moderate severity failures, the engine control circuit 212 may first adjust the one or more operational parameters of the compromised or potentially compromised cylinders 110. If the failure is not resolved by the adjustment of the one or more operational parameters, the engine control circuit 212 may cause the engine 101 to operate in a CDA or DSF mode to deactivate the potentially compromised cylinder(s). In some embodiments, the engine control circuit 212 may not activate the CDA or DSF mode if the severity is below a threshold (e.g., a low severity failure). In some embodiments, the engine control circuit 212 may determine that a severity is a low severity if it is more likely that a sensor 125 failure has occurred rather than a cylinder compromise. For example, if a fault condition is likely related to faulty cam position sensor, the engine control circuit 212 may determine that the severity is low and that no action is needed.

In some embodiments, the one or more of the thresholds used to determine the modified engine operating mode may correspond to a particular location (e.g., a country, a state, a region, a city, etc.). The controller 140 may be configured to determine a location of the system 100 (e.g., based on a location positioning system, such as a GPS). In these embodiments, engine control circuit 212 may selectively activate, deactivate, or adjust the modified engine operating mode based on the location of the system 100. More specifically, if the location of the system 100 is within a particular geo-fenced area, the engine control circuit 212 may enable a different modified engine operating mode compared to when the location of the system 100 is outside the particular geo-fenced area. For example, the geo-fenced area may correspond to a region that has relatively higher deNOx requirements. Accordingly, a respective deNOx threshold may change based on the location of the system 100. When the system enters or exits the geo-fenced area, the engine control circuit 212 may compare the cylinder data to the threshold corresponding to the location and determine whether the modified engine operating mode should be adjusted.

In some embodiments, the controller 140 may be configured to determine if the engine 101 (or a component thereof) and/or the controller 140 (e.g., processing circuitry including hardware and/or software) has experienced a tampering event. For example, if the engine control circuit 212 determines that a number of cylinders 110 beyond a predetermined threshold are compromised or potentially compromised, the controller 140 may generate a notification that the engine 101 may have experienced a potential tampering event as it is unlikely that this number of cylinders are compromised at the same time. As another example, if operating parameters exceed a predefined threshold (e.g., torque, power output, speed, temperature, etc. exceed predefined acceptable maximum calibration threshold), the controller 140 may determine a potential tampering event because operation beyond the calibration parameters is not allowed without likely tampering. In which case, the controller 140 may command a modified operating mode for the engine to mitigate against the tampering (e.g., initiate CDA).

In some embodiments the engine control circuit 212 may generate a notification indicating that one or more cylinders 110 are compromised or potentially compromised. In some embodiments, the notification may also include an indication of one or more corrective actions taken on the compromised or potentially compromised cylinder(s) 110 (e.g., an indication of initiation of CDA or other action). The engine control circuit 212 may provide the notification to the operator I/O device 130 (e.g., a fault code, a malfunction indicator lamp) and/or to one or more external computing systems 190 (e.g., via the communications interface 216).

The one or more external computing systems 190 may include computing devices (e.g., user devices, cloud computing systems, etc.) that are located external to the system 100. The one or more external computing systems 190 may be associated with an owner or operator of the system 100, a manager of a vehicle/powertrain fleet, a service repair facility, an original equipment manufacturer (OEM) of the engine 101, and/or a third party that is not associated with the system 100 (e.g., a government agency, etc.).

Figure 3:
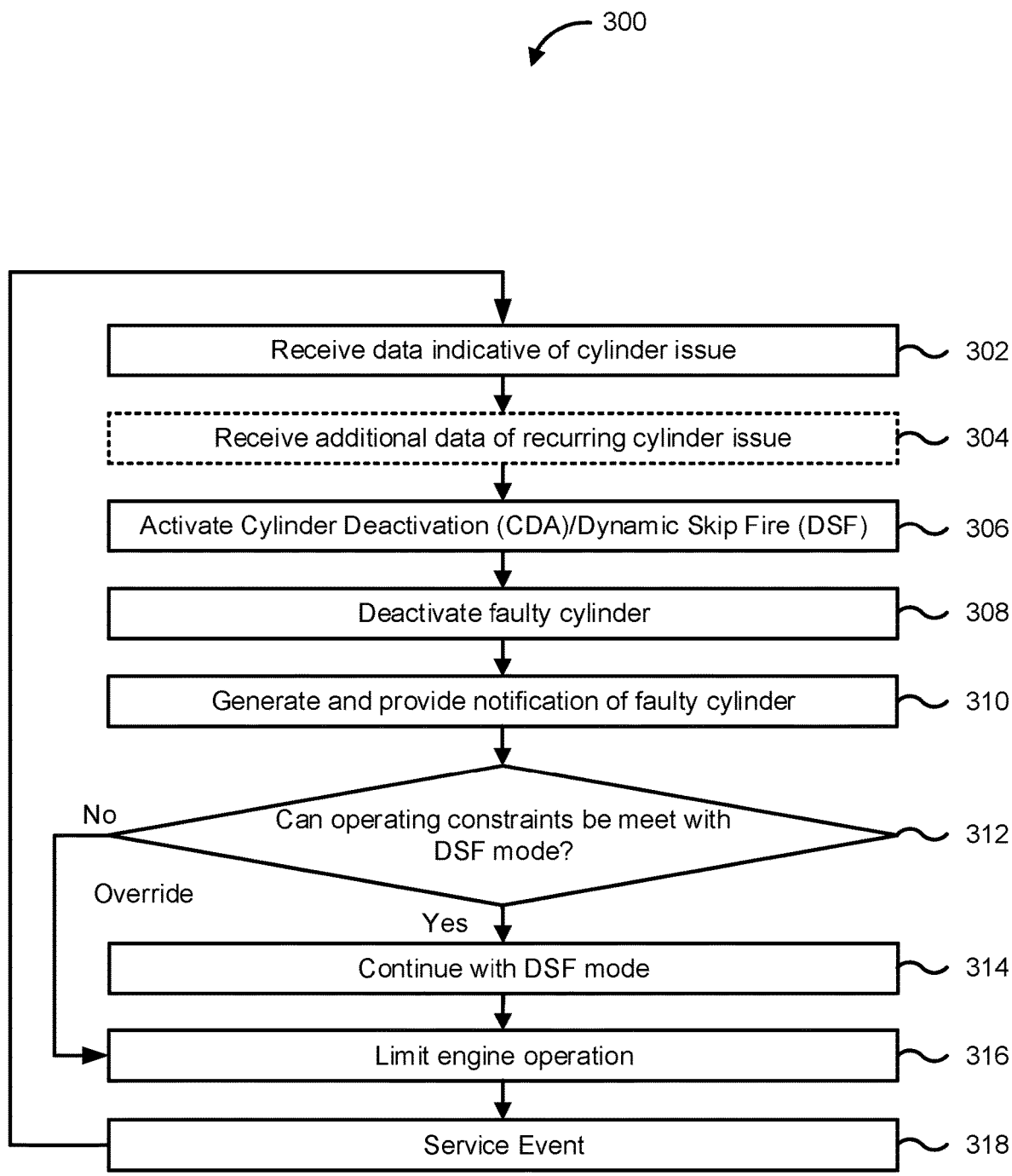
FIG. 3 is a flow diagram of a method of monitoring and controlling one or more cylinders of an engine of FIG. 1B, according to an example embodiment.

FIG. 3 is a flow diagram of a method 300 of monitoring and controlling one or more cylinders 110 of an engine 110 or other components of FIGS. 1A-1B, according to an example embodiment. In some embodiments, the controller 140 and/or one or more components thereof, such as the engine control circuit 212, is/are configured to perform method 300. For example, the controller 140 may be structured to perform the method 300, alone or in combination with other devices such as the sensors 125 and/or other components of the system 100. In some embodiments, the processes of the method 300 may be performed in a different order than as shown in FIG. 3. In some embodiments, the method 300 may include more or fewer processes than as shown in FIG. 3. For example, process 304 may be optional. In some embodiments, the processes of the method 300 may be performed concurrently, partially concurrently, or sequentially.

Referring to the method 300 in more detail, at process 302, the controller 140 receives cylinder data. As described above, the cylinder data may include one or more operational parameters of the cylinders 110 and/or sensor data from one or more sensors 125. The cylinder data may be indicative of a cylinder issue (e.g., a compromised or potentially compromised cylinder). At process 304, the controller 140 may receive additional cylinder data indicating that the cylinder issues is a recurring issue. The controller 140 may also receive an operating objective (e.g., a fuel economy).

At process 306, the controller 140 activates a CDA (e.g., DSF) mode. At process 308, the controller 140 deactivates the one or more cylinders 110 that are compromised or potentially compromised as part of the CDA mode. As described above, the deactivation may be indefinite (e.g., until a reactivation condition is meet) or temporary.

At process 310, the controller 140 generates and provides a notification of a faulty cylinder 110 (or other component, such as an intake valve actuator to enable to proper/desired air flow to the engine). The notification may include a fault code, a notification provided to the operator I/O device 130, and/or a notification provided to the external computing systems 190.

At process 312, the controller 140 determines whether one or more operating objectives of the engine 101 can be satisfied with the CDA mode active. For example, the controller 140 may compare a maximum engine output value of the modified engine operating mode (determined based on the number of cylinder 110 that are deactivated) to the operating objectives of the engine 101 including a requested or target engine output (e.g., torque, power, etc.) and/or a grade/incline of a road the vehicle is traveling on, a gross vehicle weight or vehicle load, etc. If the engine 101 cannot or likely cannot meet the operating objectives (e.g., if the target values of the objectives are greater than the maximum engine output value possible in the CDA mode), the method 300 continues to process 316. If the modified engine operating mode satisfies or likely satisfied the operating objective(s), the method 300 continues to process 314. In some embodiments, if an override condition is meet, the method 300 continues to process 316. The override condition is described herein, with respect to FIG. 2. In some embodiments, the controller 140 may determine whether one or more operating objectives of the engine 101 can be satisfied with the CDA mode active based on a severity of the failure. If the controller 140 determined that the severity of the compromised cylinders 110 is low or moderate (based on a predefined list of failures being classified as low, moderate, or high), the controller 140 may not deactivate the compromised cylinder(s) 110 and instead change one or more cylinder operating parameters (e.g., fuel injection amount, fuel injection timing, etc.). If the controller 140 determines that the severity of the compromised cylinders 110 is high, the controller 140 may deactivate the compromised cylinder(s) 110.

At process 314, the controller 140 continues to operate the engine 101 in the CDA mode. In some embodiments, the controller 140 may be configured to operate the engine 101 in the CDA mode for a predetermined period (e.g., a predetermined time period, a predetermined distance traveled, a predetermined number of engine cycles, etc.). After the predetermined period, the method 300 may continue to process 316. In other embodiments, the CDA mode is not limited, and the controller 140 may continue operating the engine 101 in the CDA mode.

At process 316, the controller 140 limits the operation of the engine 316. For example, the controller 140 may limit the torque or power output of the engine 101.

At process 318, the controller 140 receives an indication that a service event has occurred. As described above, the service event may trigger a reactivation condition such that the controller 140 disables the CDA/DSF mode and activates all cylinders 110 of the engine 101.

Figure 4:
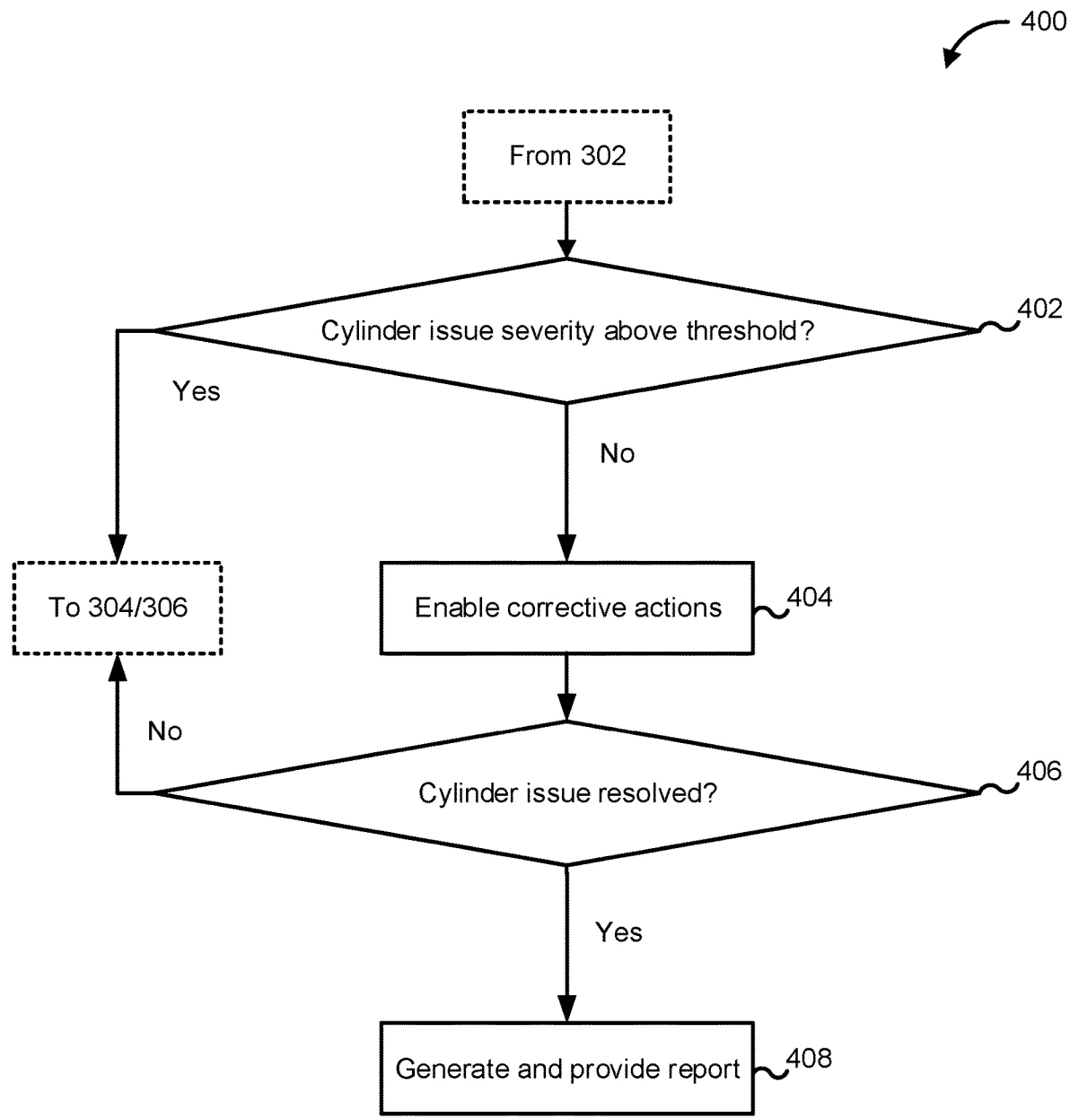
FIG. 4 is a flow diagram of a method of monitoring and controlling one or more cylinders of an engine of FIG. 1B, according to an example embodiment.

FIG. 4 is a flow diagram of a method 400 of monitoring and controlling the engine system of FIGS. 1A-1B, according to an example embodiment. In some embodiments, the controller 140 and/or one or more components thereof, such as the engine control circuit 212, is/are configured to perform method 400. For example, the controller 140 may be structured to perform the method 400, alone or in combination with other devices such as the sensors 125 and/or other components of the system 100. In some embodiments, the method 400 may include more or fewer processes than as shown in FIG. 4. In some embodiments, the processes of the method 400 may be performed in a different order than as shown in FIG. 4. In some embodiments, the processes of the method 400 may be performed concurrently, partially concurrently, or sequentially. In some embodiments, the method 400 may begin after process 302 of the method 300 and return to process 304 and/or 306 of the method 300.

Referring to the method 400 in more detail, at process 402 the controller 140 may determine whether a severity of the cylinder issue exceeds a severity threshold. As described above, the severity threshold may be a moderate severity. If the severity does exceed the severity threshold, the method 400 may continue to process 306 (or process 304) of the method 300. If the severity does not exceed the severity threshold, the method 400 may continue to process 404.

At process 404, the controller 140 may enable one or more corrective actions to correct or attempt to correct the cylinder failure. As described above, the controller 140 may adjust one or more operating parameters of the cylinders 110 that are compromised or potentially compromised.

At process 406, the controller 140 may determine whether the cylinder issue has been resolved subsequent to the corrective actions (e.g., implementing CDA to deactivate the compromised cylinder, controlling an operating parameter of the engine such as a fuel injection value, etc.). If the cylinder issue was not resolved (e.g., the fault indicator turned off, the engine operating parameters changed to be within a desired range such as below a high temperature threshold, etc.), the method 400 may continue to process 306 (or process 304) of the method 300. If the cylinder issue was resolved, the method 400 may continue to process 408. At process 408, the controller 140 generates and provides a notification of that a cylinder issue has been identified and corrected. The notification may include a fault code, a notification provided to the operator I/O device 130, and/or a notification provided to the external computing systems 190.

Figure 5:
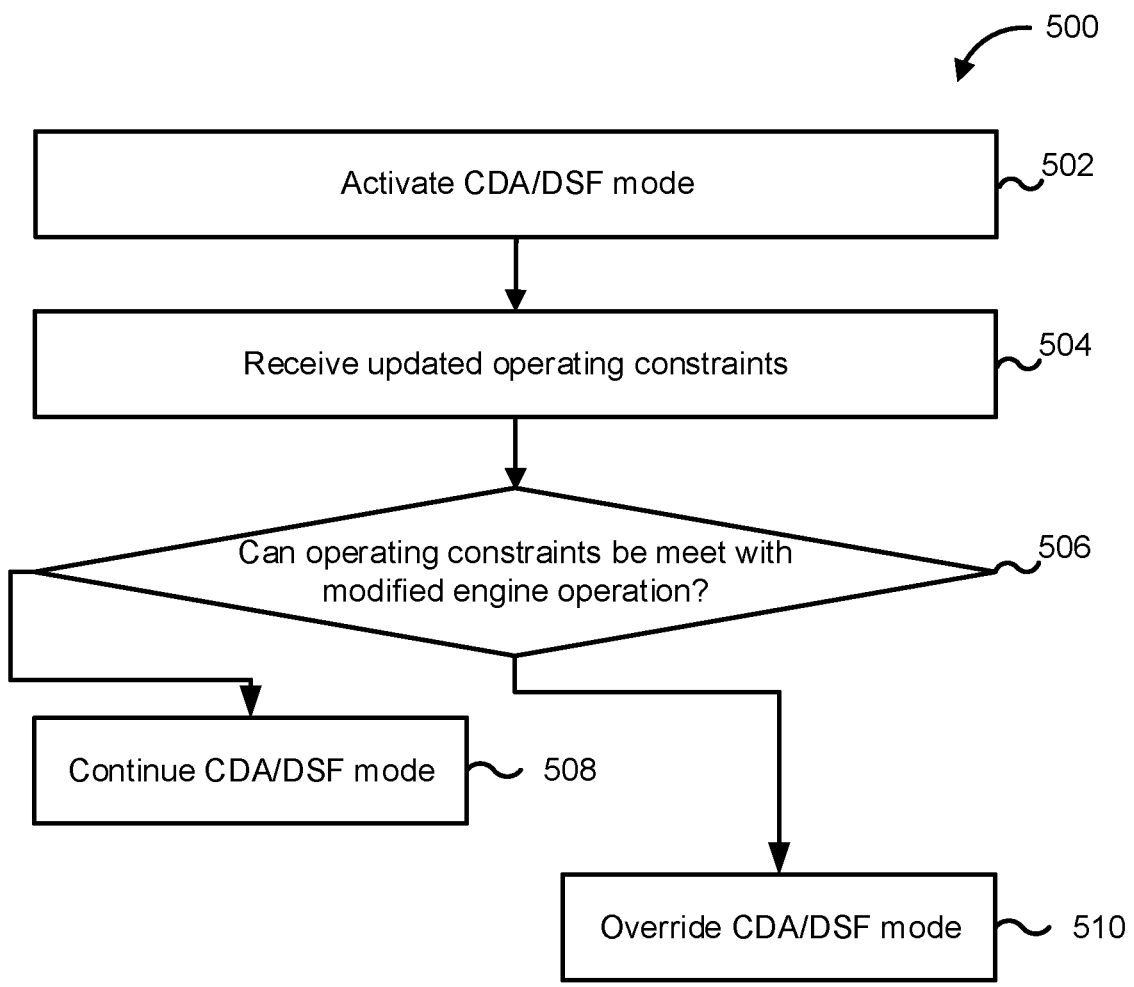
FIG. 5 is a flow diagram of a method of monitoring and controlling one or more cylinders of an engine of FIG. 1B, according to an example embodiment.

FIG. 5 is a flow diagram of a method 500 of monitoring and controlling the engine system of FIGS. 1A-1B, according to an example embodiment. In some embodiments, the controller 140 and/or one or more components thereof, such as the engine control circuit 212, is/are configured to perform method 500. For example, the controller 140 may be structured to perform the method 500, alone or in combination with other devices such as the sensors 125 and/or other components of the system 100. In some embodiments, the processes of the method 500 may be performed in a different order than as shown in FIG. 5. In some embodiments, the method 500 may include more or fewer processes than as shown in FIG. 5. In some embodiments, the processes of the method 500 may be performed concurrently, partially concurrently, or sequentially. In some embodiments, the method 500 may be performed concurrently or partially concurrently with the method 300. For example, at least process 502 of the method 500 is the same as process 306 of the method 300.

Referring to the method 500 in more detail, at process 502, the controller 140 activates a CDA/DSF mode. At process 504, the controller 140 receives an updated operating objective. The updated operating objectives may include a change in torque or power demand, a change in location (e.g., entering or exiting a geo-fenced location), a critical mission or situation indication, and/or any of the other objectives described herein.

At process 506, the controller 140 determines whether the engine 101 can or likely can meet the one or more operating objectives with the modified engine operating mode (e.g., the CDA mode). If the controller 140 determines that the engine 101 can meet or likely meet the updated objectives, the method 500 continues to process 508. If the controller 140 determines that the engine 101 cannot meet the updated objectives, the method 500 continues to process 510.

At process 508, the controller 140 may continue operating the engine 101 with the CDS/DSF mode. In this way, the controller 140 advantageously enables the system 100 to complete a mission and/or achieve the operating objectives of the system 100 without exacerbating a cylinder issue (e.g., by deactivating a problem cylinder). At process 510, the controller 140 may determine that an override condition has been met and override the CDA/DSF mode. When the controller 140 overrides the CDA/DSF mode, the CDA/DSF mode may be deactivated, and all cylinders 110 may be activated.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the activities and functionalities of the aftertreatment control circuit may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices.

While the term "processor" is briefly defined above, the term "processor" and "processing circuit" are meant to be broadly interpreted. In some embodiments, the one or more processors may be external to the apparatus (e.g., on-board vehicle controller), for example the one or more processors may be or included with a remote processor (e.g., a cloud based processor). In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on a local computer, partly on the local computer, as a stand-alone computer-readable package, partly on the local computer and partly on a remote computer, etc. In the latter scenario, the remote computer may be connected to the local computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A system comprising:
a controller comprising at least one processing circuit comprising at least one memory coupled to at least one processor, the controller configured to:
receive data regarding operation of an engine indicating that one or more cylinders of a plurality of cylinders of the engine is compromised;
cause the engine to operate in a modified engine operating mode whereby operation of the one or more cylinders that are compromised is modified; and
cause the engine to operate in a non-modified engine operating mode whereby operation of the one or more cylinders that are compromised is not modified, responsive to receiving information regarding a predetermined condition despite the data regarding operation of the engine indicating that the one or more cylinders of the plurality of cylinders of the engine is compromised.

2. The system of claim 1, wherein the predetermined condition comprises an engine load value that is at or above a predefined engine load threshold.

3. The system of claim 1, wherein the predetermined condition is based on a received mission characteristic of the system satisfying a predefined mission characteristic, wherein the predefined mission characteristic includes one of a predetermined speed or a predetermined weight value of the system.

4. The system of claim 1, wherein the controller is further configured to:
receive cylinder data regarding operation of the plurality of cylinders;
determine a severity of the compromised one or more cylinders based on comparing the cylinder data to a predetermined threshold; and
prevent the one or more cylinders from operating in the modified engine operating mode responsive to determining that the severity is less than a predefined severity threshold.

5. The system of claim 1, wherein the controller is further configured to:
receive an indication that the predetermined condition is no longer met; and
cause the engine to operate in the modified engine operating mode based on the predetermined condition no longer being met and the data regarding operation of the engine indicating that the one or more cylinders of the plurality of cylinders of the engine is compromised.

6. The system of claim 1, wherein the modified engine operating mode includes adjusting at least one of an intake valve or an exhaust valve of the one or more cylinders that is compromised, wherein adjusting the at least one of the intake valve or the exhaust valve comprises at least one of:
closing or substantially closing the intake valve;
closing or substantially closing the exhaust valve; or
adjusting a valve value comprising at least one of a valve timing or a valve lift amount of the at least one of the intake valve or the exhaust valve.

7. The system of claim 1, wherein the modified engine operating mode includes adjusting a fueling value comprising at least one of a fuel injection quantity or a fuel injection timing.

8. A system, comprising:
at least one processor; and
at least one memory coupled to the at least one processor, the at least one memory storing instructions that, when executed by the at least one processor, cause the at least one processor to:
receive data regarding operation of an engine indicating that one or more cylinders of a plurality of cylinders of the engine is compromised;
cause the engine to operate in a modified engine operating mode whereby operation of the one or more cylinders that is compromised is modified; and
cause the engine to operate in a non-modified engine operating mode whereby operation of the one or more cylinders that is compromised is not modified based on receiving information regarding a predetermined condition despite the data regarding operation of the engine indicating that the one or more cylinders of the plurality of cylinders of the engine is compromised.

9. The system of claim 8, wherein the predetermined condition comprises an engine load value that is at or above a predefined engine load threshold.

10. The system of claim 8, wherein the predetermined condition is based on a received mission characteristic of the system satisfying a predefined mission characteristic, wherein the predefined mission characteristic includes one of a predetermined speed or a predetermined weight value of the system.

11. The system of claim 8, wherein the instructions, when executed by the at least one processor, further cause the at least one processor to:
receive cylinder data regarding operation of the plurality of cylinders;
determine a severity of the compromised one or more cylinders based on comparing the cylinder data to a predetermined threshold; and
prevent the one or more cylinders from operating in the modified engine operating mode responsive to determining that the severity is less than a predefined severity threshold.

12. The system of claim 8, wherein the instructions, when executed by the at least one processor, further cause the at least one processor to:
receive an indication that the predetermined condition is no longer met; and
cause the engine to operate in the modified engine operating mode based on the predetermined condition being no longer met and the data regarding operation of the engine indicating that the one or more cylinders of the plurality of cylinders of the engine is compromised.

13. The system of claim 8, wherein the modified engine operating mode includes adjusting at least one of an intake valve or an exhaust valve of the one or more cylinders that are compromised, wherein adjusting the at least one of the intake valve or the exhaust valve comprises at least one of:
closing or substantially closing the intake valve;
closing or substantially closing the exhaust valve; or
adjusting a valve value comprising at least one of a valve timing or a valve lift amount of the at least one of the intake valve or the exhaust valve.

14. The system of claim 8, wherein the modified engine operating mode includes adjusting a fueling value comprising at least one of a fuel injection quantity or a fuel injection timing.

15. A method comprising:
receiving data regarding operation of an engine indicating that one or more cylinders of a plurality of cylinders of the engine is compromised;
causing the engine to operate in a modified engine operating mode whereby operation of the one or more cylinders that is compromised is modified; and
causing the engine to operate in a non-modified engine operating mode whereby operation of the one or more cylinders that is compromised is not modified based on receiving information regarding a predetermined condition despite the data regarding operation of the engine indicating that the one or more cylinders of the plurality of cylinders of the engine is compromised.

16. The method of claim 15, wherein the predetermined condition comprises an engine load value that is at or above a predefined engine load threshold.

17. The method of claim 15, wherein the predetermined condition is based on a received mission characteristic of the engine satisfying a predefined mission characteristic, wherein the predefined mission characteristic includes one of a predetermined speed of the engine or a predetermined weight value of a system including the engine.

18. The method of claim 15, further comprising:
receiving cylinder data regarding operation of the plurality of cylinders;
determining a severity of the compromised one or more cylinders based on comparing the cylinder data to a predetermined threshold; and
preventing the one or more cylinders from operating in the modified engine operating mode responsive to determining that the severity is less than a predefined severity threshold.

19. The method of claim 15, further comprising:
receiving an indication that the predetermined condition is no longer met; and
causing the engine to operate in the modified engine operating mode based on the predetermined condition being no longer met and the data regarding operation of the engine indicating that the one or more cylinders of the plurality of cylinders of the engine is compromised.

20. The method of claim 15, wherein the modified engine operating mode includes adjusting at least one of an intake valve or an exhaust valve of the one or more cylinders that are compromised, wherein adjusting the at least one of the intake valve or the exhaust valve comprises at least one of:
closing or substantially closing the intake valve;
closing or substantially closing the exhaust valve; or
adjusting a valve value comprising at least one of a valve timing or a valve lift amount of the at least one of the intake valve or the exhaust valve.

* * * * *